United States Patent [19]

Funakoshi et al.

[11] Patent Number: 4,472,539
[45] Date of Patent: Sep. 18, 1984

[54] POLYOLEFIN SERIES COMPOSITION COMPRISING SURFACE TREATMENT OF FILLER AND POLYOLEFIN PRIOR TO BLENDING OF COMPONENTS

[75] Inventors: Yasutomo Funakoshi, Sakai; Fumio Iwami, Hirakata; Tadashi Sakairi; Tamotsu Wakahata, both of Katano, all of Japan

[73] Assignee: Matsushita Electric Industrial Co., Ltd., Osaka, Japan

[21] Appl. No.: 380,271

[22] Filed: May 20, 1982

[30] Foreign Application Priority Data

May 20, 1981 [JP] Japan ................................. 56-77209

[51] Int. Cl.³ .......................... C08K 3/34; C08K 5/54; C08K 9/12; C08K 9/06
[52] U.S. Cl. .................................. 523/212; 523/213; 523/214; 524/449; 524/456; 428/389; 428/391
[58] Field of Search ....................... 523/212, 213, 214; 524/456; 428/389

[56] References Cited

U.S. PATENT DOCUMENTS

| | | | |
|---|---|---|---|
| 3,472,729 | 10/1969 | Sterman et al. | 523/214 |
| 3,733,300 | 5/1973 | Fujita et al. | 523/214 |
| 3,802,913 | 4/1974 | MacKenzie | 428/389 |
| 3,956,230 | 5/1976 | Gaylord | 524/425 |
| 4,005,254 | 1/1977 | MacKenzie | 523/212 |
| 4,303,574 | 12/1981 | Vostovich | 428/389 |
| 4,327,001 | 4/1982 | West et al. | 524/456 |
| 4,409,342 | 10/1983 | Aucker et al. | 523/213 |

OTHER PUBLICATIONS

Derwent Abstract 03563j/48, Oct. 25, 1982, Matsushita Elect. Ind. K.K.
Derwent Abst. 50013c/29, (DT2856381), 7-1980.
Derwent Abst. 79012a/44, (J53110645), 9-1978.
Derwent Abst. 76419y/43, (J50124945), 10-1975.
Derwent Abst. 90276d/49, (J56137937), 10-1981.
Derwent Abst. 70975d/39, (J56102007), 8-1981.
Derwent Abst. 24908e/13, (J57030731) and 24909e/13, (J57030732), 2-1982.
Derwent Abst. 35423e/18, (DE3035709), 4-1982.

Primary Examiner—Herbert J. Lilling
Attorney, Agent, or Firm—Birch, Stewart, Kolasch & Birch

[57] ABSTRACT

Composition is characterized in that ethylenically unsaturated group ($CH_2=C<$) operation is performed, under the existence of dispersion agent and antioxidant, to polyolefin series composition, and at least one kind of epoxy group and amino group is filler-graft-bonded with olefin through organic peroxide.

32 Claims, 2 Drawing Figures

POLYOLEFIN SERIES COMPOSITION COMPRISING SURFACE TREATMENT OF FILLER AND POLYOLEFIN PRIOR TO BLENDING OF COMPONENTS

BACKGROUND OF THE INVENTION

1. Field of the Invention

The present invention relates to an inorganic substance filled and reinforced polyolefin series composition and more particularly to a polyolefin series composition, wherein, inorganic loading material is caused to be contained in the polyolefin so that the inorganic loading material and the polyolefin are caused to be chemically bonded with each other in their interface.

2. Description of the Prior Art

Generally, a polyolefin series composition wherein polyolefin has been packed only with inorganic loading material can be improved in rigidity and heat resistance, but is considerably deteriorated in mechanical strength, particularly impact resisting strength, thus resulting in a big problem in practical use. Also, as the blending amount of the inorganic loading material against polyolefin increases, the fluidity of the polyolefin is considerably spoiled and the appearance of the molded goods produced thereby is very poor, thus being impractical.

As a method of solving these disadvantages, it was devised that after the inorganic loading material had been treated on the surfaces by paraffin series hydrocarbon, higher fatty acid, metallic soap or the like, it could be packed into the polyolefin. However, according to this method, the appearance of the molded goods produced thereby could be somewhat improved, but the mechanical strength thereof could not be improved.

Then, another method was devised of packing the inorganic loading material into the polyolefin after the inorganic loading material had been treated on surfaces with organic silane series compound or organic titanium series compound. According to this method, the appearance of the mold goods produced thereby could be considerably improved, but the mechanical strength was insufficiently improved.

Furthermore, a further method is devised of first producing a denatured propylene polymer wherein an unsaturated compound having a carboxyl group therein is graft-polymerized, and then surface-treating the inorganic loading material with an organic silane compound, thereby to heat and reinforce both of them. However, this method has the following disadvantages.

(1) Since the denatured polypropylene is required to be produced in advance, heating, mixing and kneading processes are required by a Banbury type mixer, an extruding machine, etc. to provide the denatured polypropylene. The denatured propylene thus provided becomes extremely high in cost, resulting in that the economical effect of the polypropylene, which is used because of its lower price, is removed.

(2) Since the polypropylene receives heating at two stages where the denatured polypropylene is provided and where the inorganic loading material is further added for the mixing and kneading operation, the property of matter is deteriorated and, the color is changed due to the decreased molecular weight, thus resulting in problems in practical use.

(3) The tack force of the denatured polypropylene itself rises greatly and, when the inorganic loading material is added to the denatured polypropylene, the dispersibility of the inorganic loading material becomes worse with increase in blending quantity, resulting in that the extruding operation becomes extremely worse.

SUMMARY OF THE INVENTION

Accordingly, an object of the present invention is to provide inorganic substances filled and reinforced polyolefin series composition, which can eliminate the disadvantages inherent in the conventional compositions and which is superior in mechanical strength and heat-resistance.

Another object of the present invention is to provide polyolefin series composition which has the matter property and heat-resistance, which are extremely superior as compared with a conventional case where the denatured polyolefin is manufactured in advance.

After earnest researches had been made to settle the disadvantages of the conventional method, the present inventors have found a solid polyolefin series composition, which had not been previously known.

Accordingly, the present invention relates to polyolefin series composition, which is provided through the heating and interfacial bonding of a uniformly blended mixture of a polyolefin and an inorganic loading material, under the existence of a dispersion agent and an antioxidant, the polyolefin being coated in advance with an organic silane series compound and an organic peroxide.

Namely, the present invention provides polyolefin series compositions composed of a composition, which is provided through the heating and bonding under the existence of dispersion agent and antioxidant, and which is a mixture of a coated polyolefin and a coated inorganic loading material wherein a polyolefin coated on the surfaces with a mixture of an organic peroxide and an organic silane series compound including at least one kind among ethylenically unsaturated Group ($CH_2=C<$), epoxy group, amino group is uniformly blended with an inorganic loading material coated with at least one kind among the above-described organic silane series compounds, the blending amount of the inorganic loading material being 15 through 80% by weight.

The polyolefin series composition of the present invention has the following advantages.

(1) The denatured polyolefin is not required to be produced in advance and, since a heating, polymerizing process by a Banbury type mixer, an extruding machine or the like will suffice at one stage, the inexpensive interfacial polymerizing polyolefin series composition can be provided, thus resulting in an extremely high economical effect.

(2) Since the heating, polymerizing process by the Banbury type mixer, the extruding machine or the like is performed at one stage, the polyolefin receives one heating operation. Thus, the matter of property is not deteriorated and the color is not changed due to the decreased molecular weight. Accordingly, a polyolefin series composition which is extremely superior in mechanical strength can be provided.

(3) According to the present invention, the heating, interfacial polymerization is caused to be performed, by the Banbury type mixer, the extruding machine or the like, under the existence of a dispersion agent and an antioxidant. The oxidation deterioration of the polyolefin during the heating fusion can be prevented by an antioxidant existing uniformly around the polyolefin and, thus, the polyolefin series composition, which is extremely high in heat-resistance stability, can be provided.

(4) According to the present invention, the heating, interfacial polymerization is caused to be performed, by the Banbury type mixer, the extruding machine or the like under the existence of the dispersion agent and the antioxidant. The tact property of the denatured polyolefin can be prevented by the dispersion agent and, thus, the polyolefin series composition, which is extremely uniformly dispersed in inorganic loading material, can be provided, even if the blended amount of the inorganic loading material increases.

The object and other objects, features, aspects, and advantages of the present invention will become more apparent from the following detailed description of preferred embodiments according to the present invention when taken in conjunction with the accompanying drawings.

DESCRIPTION OF THE PREFERRED EMBODIMENTS

Figure 1:
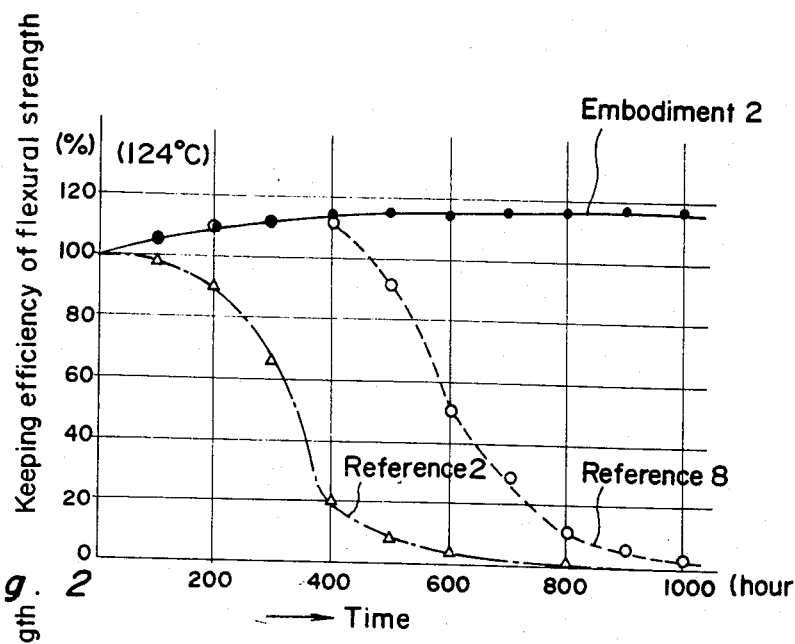
FIG. 1 and FIG. 2 are graphs showing the results of the heat resistance tests, respectively, at 124° C. and 142° C. in the embodiments of the present invention.

According to the present invention, a polyolefin series composition is characterized in that a composition including at least one kind of ethylenically unsaturated Group ($CH_2=C<$), epoxy group and amino group is graft-bonded, in the presence of a dispersion agent and antioxidant, with an olefin and filler by means of an organic peroxide.

The polyolefin to be used in the present invention includes ethylene polymer, propylene polymer, ethylene-propylene random copolymer, ethylene-propylene block copolymer or the like. One of these will be employed.

The inorganic loading material to be used in the present invention includes calcium carbonate, barium sulfate, talc, mica, calcium silicate, glass fiber or the like. Anyone of them will do. Since the calcium carbonate, barium sulfate, talc are small in aspect ratio, reinforcing effect is lower. The inorganic loading material which is 2 or more in aspect ratio will be employed.

The mica, which is high in aspect ratio, can be provided but is restricted in usage in terms of coloring property. Also, the glass fiber has a problem of direction property, but calcium silicate is suitable.

As the organic silane series compound to be used in the present invention, the following compounds will be suitable.

$CH_2=CHSiCl_3$, $CH_2=CHSi(OCH_2CH_3)_3$,
$CH_2=CHSi(OCH_2CH_2OCH_3)_3$,

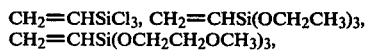

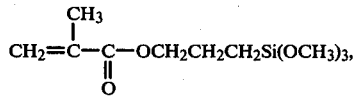

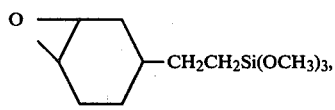

-continued

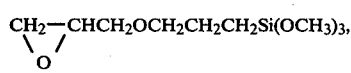

and so on.

The organic peroxide to be used in the present invention is benzoyl peroxide, di-cumyl peroxide or the like.

The amount used of the organic peroxide is preferable to stay within 0.01 through 1.0% by weight with respect of the polyolefin. The reaction efficiency of the organic silane series compound is lower in a case where the amount is 0.01% or less by weight. The property of matter is lowered or the color is changed due to the deterioration of the polyolefin in a case where the amount is 1.0% or more by weight.

The dispersion agent used in the present invention will do if the gliding effect is high, and higher fatty acid, metallic soap, fatty acid amide or the like can be used.

The amount used of the dispersion agent is preferable to be 0.05 through 3.0% by weight. The desired gliding effect is not provided in the heating interfacial polymerization when the amount is 3.0% by weight, while the matter property of the polyolefin series composition provided is undesirably injured when the amount is 3.0% or more by weight.

As the antioxidant used in the present invention, there can be employed a combination of one kind, two kinds or more from phenol series antioxidant, thioester series antioxidant, phosphorus series antioxidant generally used in the polyolefin.

The amount used of the antioxidant is preferably within the range of 0.01 through 3.0% by weight. The oxidation of the polyolefin is not prevented from being deteriorated during the heating interfacial polymerization when the amount is 0.01% or less by weight. The oxidation deterioration preventing effect remains unchanged when the amount is 3.0% or more by weight and, thus, such a fact is economically undesirable.

The present invention is characterized in that a mixture, wherein a polyolefin coated previously by the organic silane series compound, inorganic loading material, and organic peroxide are uniformly blended, is heated and interfacially bonded under the existence of the dispersion agent and the antioxidant. More particularly, the organic silane series compound is caused to be chemically combined on the interface between the polyolefin and the inorganic loading material in the heating process of one stage under the existence of the dispersion agent and the antioxidant.

Then, the organic silane series compound which will contribute towards such reaction has a functional group such as methoxy group, chloro group, ethoxy group which can react to the inorganic loading material, and furthermore can react to the polyolefin. The organic silane series compound has a functional group such as vinyl group, methacryloxy group, amino group, cyclic epoxy group, glycidoxy group, mercapt group, etc. The organic silane series compounds which are more suitable, include those with a methacryloxy group, vinyl group, amino group, methoxy group, ethoxy group, etc.

The polyolefin or the inorganic loading material is coated with the organic silane series compound. The coating operation can be effected by the use of a Henschel mixer, a ribbon blender, a ball mill, etc., and can be performed even at normal temperatures. The coating operation can be more uniformly effected at high temperatures of 30° through 150° C.

Then, the organic silane series compound and the organic peroxide, which have been dissolved in advance, with organic solvent, in 1 polyolefin are uniformly blended by the Henschel mixer, the ribbon blender, the ball mill or the like. The appropriate organic solvent having a boiling point of 30° C. through 80° C. is selected. The blending operation is desirably performed at 30° C. through 80° C. where the solvent activation and the evaporation exhaust can be performed at the same time.

Furthermore, the dispersion agent, the antioxidant and the inorganic loading material coated previously with the organic silane series compound are thrown into the mixture for uniform blending operation.

The organic silane compound dissolved or dispersed previously in the organic solvent, and the polyolefin are uniformly blended by a Henschel mixer, a ribbon blender, a ball mill or the like. Then, the organic silane series compound dissolved or dispersed in the organic solvent, and the organic peroxide are uniformly mixed, by a Henschel mixer, a ribbon blender, a ball mill or the like, with the inorganic loading material. Then, the dispersion agent, the antioxidant, the above-described treated polyolefin and the treated inorganic loading material are uniformly mixed by a Henschel mixer, a ribbon blender, a ball mill or the like. The blending operation is best performed at 30° C. through 80° C. as in the mixture 1.

The mixture of the organic silane compound, the coated polyolefin and inorganic loading material, the organic peroxide, the dispersion agent and the antioxidant, which are provided in such manner as described hereinabove is heated, blended and kneaded. The organic silane series compound is chemically combined, in a heating process of one stage under the existence of the dispersion agent and the antioxidant, on the interface of the polyolefin and the inorganic loading material, so that polyolefin series composition which is superior in mechanical strength and heat-resistance can be provided. The Banbury type mixer, the heat roll, the extruding machine or the like are suitable as the heating, mixing and kneading machine and the extruding machine is suitable in terms of economy.

When the blended amount of the inorganic loading material is 10% or less by weight, the heat resistance, rigidity, etc. are not improved. Also, when the blended amount thereof is 90% or more by weight, the appearance of the molded goods is considerably damaged. The blended amount of the inorganic loading material is suitable at 10 through 80% by weight.

The present invention will be described hereinafter in embodiments.

EMBODIMENTS 1 THROUGH 3

As an inorganic loading material, calcium silicate was used, and a coating operation was effected under the temperature of 60° C., by a Henschel mixer, at a ratio of gamma methacryloxy propyl trimethoxy silane 0.5 part by weight dissolved in water adjusted in PH3 through PH5 with respect to the calcium silicate 100 parts by weight. After the coating operation, it was sufficiently dried.

Figure 2:
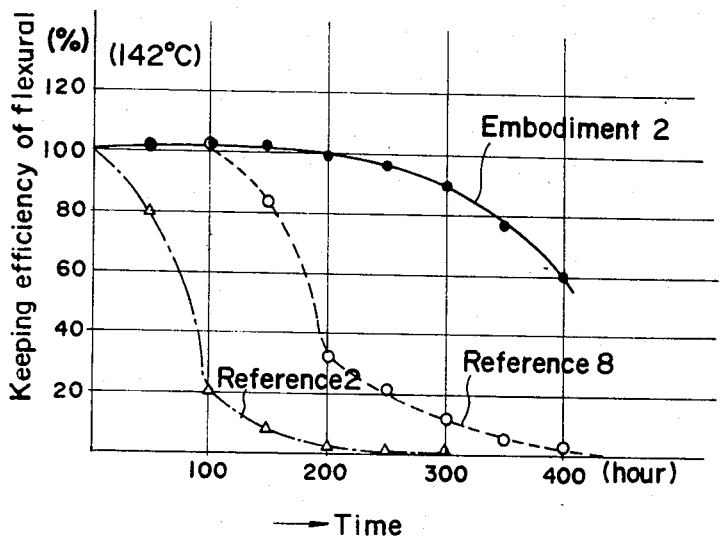

The uniform blending was effected under the temperature of 50° C., by a Henschel mixer, at a ratio of gamma methacryloxy propyl trimethoxy silane 0.5 part by weight dissolved in dichloromethane and benzoyl peroxide 0.3 part by weight with respect to the polypropylene powder 100 parts by weight of MI=13. In addition, calcium stearate 0.1 part by weight, 2,2'-methylenebis(4-methyl-6-tertiary-butyl-phenol)0.05 part by weight, dilaurilthiodipropionate 0.05 part by weight and calcium silicate coated with gamma methacryloxy propyl trimethoxy silane were added to this mixture and were uniformly blended at the temperature of 50° C. This mixture were mixed, kneaded and granulated at the resin temperature 210° through 220° C. by a double-axle extruding machine of 30 mm in screw diameter thereby to provide pellets. After the sufficient drying operation of the pellets, various types of test pieces were manufactured through the injection molding and were examined on various types of matter property. The results of the matter property examination are shown in Table 1, and the results of the heat-resistance tests in the composition of the embodiment 2 are shown in FIG. 1 and FIG. 2.

TABLE 1

Results of Matter Property Tests in compositions of Embodiments according to the present invention

| Test items | Embodiment 1 | Embodiment 2 | Embodiment 3 |
|---|---|---|---|
| | Coated loading material blending amount (% by weight) | | |
| | 30 | 55 | 70 |
| Tensile strength (kg/cm$^2$) | 370 | 410 | 415 |
| Flexural strength (kg/cm$^2$) | 590 | 905 | 970 |
| Flexural modulus (kg/cm$^2$) | 32,000 | 61,000 | 69,000 |
| Izod impact strength (kg-cm/cm$^2$) (with notch) | 6.5 | 3.3 | 3.0 |

(Note)
Tensile strength ... ASTM D-638
Bending strength ... ASTM D-790
Bending elastic rate ... ASTM D-790
Izod impact strength ... ASTM D-256

REFERENCES 1 THROUGH 3

The mixing, kneading operations were effected, as in the embodiments 1 through 3, at a given blending with the calcium silicate and propylene powder used in the embodiments 1 through 3. Thereafter, test pieces were manufactured by an injection molding machine and were tested in the property of matter, and the results are shown in Table 2. Also, the results of the heat-resistance tests of the composition of a reference example 2 are shown in FIG. 1 and FIG. 2

TABLE 2

Results of Matter Property Tests in compositions of References as comparison examples with the Embodiments

| Test items | Reference 1 | Reference 2 | Reference 3 |
|---|---|---|---|
| | Loading material blending amount (% by weight) | | |
| | 30 | 55 | 70 |
| Tensile strength (kg/cm$^2$) | 320 | 305 | 275 |
| Flexural strength (kg/cm$^2$) | 530 | 590 | 515 |
| Flexural modulus (kg/cm$^2$) | 29,000 | 38,000 | 48,000 |
| Izod impact | 2.0 | 1.8 | 1.1 |

TABLE 2-continued

Results of Matter Property Tests in compositions of References as comparison examples with the Embodiments

| | Reference 1 | Reference 2 | Reference 3 |
|---|---|---|---|
| strength (kg-cm/cm$^2$) (with notch) | | | |

EMBODIMENTS 4 THROUGH 6

Test pieces were manufactured in the very same manner as that of the embodiments 1 through 3 with the exception of the use of mica as the inorganic loading material. The test pieces were examined in various matter properties and the results are shown in Table 3.

TABLE 3

Results of Matter Property Tests in compositions of Embodiments according to the present invention

| | Embodiment 4 | Embodiment 5 | Embodiment 6 |
|---|---|---|---|
| | Coated loading material blending amount (% by weight) | | |
| Test items | 20 | 40 | 60 |
| Tensile strength (kg/cm$^2$) | 370 | 400 | 420 |
| Flexural strength (kg/cm$^2$) | 590 | 780 | 810 |
| Flexural modulus (kg/cm$^2$) | 35,000 | 49,000 | 63,000 |
| Izod impact strength (kg-cm/cm$^2$) (with notch) | 5.8 | 3.9 | 3.2 |

REFERENCES 4 THROUGH 6

Test pieces were manufactured in the very same manner as that of the reference embodiments 1 through 3 with the exception of the use of mica as the inorganic loading material in the embodiments 4 through 6. The test pieces were examined in various matter properties, and the results are shown in Table 4.

TABLE 4

Results of Matter Property Tests in compositions of References as comparison examples with the Embodiments

| | Reference 4 | Reference 5 | Reference 6 |
|---|---|---|---|
| | Loading material blending amount (% by weight) | | |
| Test items | 20 | 40 | 60 |
| Tensile strength (kg/cm$^2$) | 320 | 320 | 300 |
| Flexural strength (kg/cm$^2$) | 540 | 610 | 580 |
| Flexural modulus (kg/cm$^2$) | 32,000 | 39,000 | 54,000 |
| Izod impact strength (kg-cm/cm$^2$) (with notch) | 2.0 | 1.7 | 1.0 |

REFERENCES 7 THROUGH 9

The uniform blending operation was performed by a Henschel mixer, at the same blending as that of embodiment 1, with polypropylene powder, organic silane series compound and benzoyl oxide used in the embodiments 1 through 3. The mixture was heated, mixed, kneaded by a double-axle extruding machine used in the embodiment 1. Thereafter, denaturated polypropylene, which was denatured by the organic silane series compound, was provided. The blending operation was effected, at the very same blending amount at that of the embodiments 1 through 3, with the denatured polypropylene, and gamma methacryloxy propyl trimethoxy silane coating calcium silicate, dispersion agent, antioxidant used in the embodiments 1 through 3. Thereafter, the mixture was blended and kneaded again by the double-axle extruding machine thereby to provide the pellets. After the sufficient drying operation of the pellets, various test pieces were manufactured for the matter property tests, and the results are shown in Table 5. Also, the results of heat-resistance tests of the composition of the reference embodiment 8 are shown in FIG. 1 and FIG. 2.

TABLE 5

Results of Matter Property Tests in compositions of References as comparison examples with the Embodiments

| | Reference 7 | Reference 8 | Reference 9 |
|---|---|---|---|
| | Loading material blending amount (% by weight) | | |
| Test items | 30 | 55 | 70 |
| Tensile strength (kg/cm$^2$) | 365 | 380 | 380 |
| Flexural strength (kg/cm$^2$) | 570 | 615 | 640 |
| Flexural modulus (kg/cm$^2$) | 33,000 | 43,000 | 56,000 |
| Izod impact strength (kg-cm/cm$^2$) (with notch) | 5.7 | 3.7 | 2.9 |

In addition, the other embodiments are shown in embodiments 7 and 8.

EMBODIMENT 7

The gamma methacryloxy propyl trimethoxy silane dissolved in dichloromethane, with the composition of the embodiment 2, benzoyl-peroxide, dispersion agent and antioxidant were uniformly blended, by a Henschel mixer at the temperature of 50° C., with the inorganic loading material used in the embodiments 1 through 3. Then, the mixed solution of the gamma methacryloxy silane dissolved in dichloromethane was coated, at the temperature of 50° C. by a Henschel mixer, on the surface of the polyolefin. In addition, the above-described treated inorganic loading material was mixed, at the temperature of 50° C. by the Henschel mixer, with the coated polyolefin. The mixer was blended, kneaded by a double-axle extruding machine and was granulated to provide pellets. After the sufficient drying operation of the pellets, various test pieces were manufactured for matter property tests, and the results are shown in Table 6.

TABLE 6

Results of Matter Property Tests in composition of Embodiment according to the present invention

| | Embodiment 7 |
|---|---|
| | Coated loading material blending amount (% by weight) |
| Test items | 55 |

TABLE 6-continued

Results of Matter Property Tests in composition of Embodiment according to the present invention

| | Embodiment 7 |
|---|---|
| Tensile strength (kg/cm$^2$) | 435 |
| Flexural strength (kg/cm$^2$) | 900 |
| Flexural modulus (kg/cm$^2$) | 62,500 |
| Izod impact strength (kg-cm/cm$^2$) (with notch) | 4.3 |

EMBODIMENT 8

A blended solution wherein gamma methacryloxy propyl trimethoxy silane 0.5 part by weight was dissolved in dichloromethane was added to the inorganic loading material used in the embodiments 1 through 3 and was coated at the temperature of 50° C. by a Henschel mixer. After the treatment, it was sufficiently dried. Then, a blended solution wherein benzoyl-peroxide 0.3 part by weight with respect to gamma methacryloxy propyl trimethoxy silane 0.3 part by weight was dissolved in dichloromethane was added to polyolefin and was coated at the temperature of 50° C. by a Henschel mixer. Then, the above-described treated inorganic loading material was added, at the blending of the embodiment 2, to the coated polyolefin. In addition, the dispersion agent and antioxidant used in the embodiments 1 through 3 were added thereto. The uniform blending operation was effected at 50° C. The mixture was blended, kneaded and granulated in the same manner as that of the embodiment 2. Thereafter, pellets were provided. The pellets were used to manufacture the test pieces for matter property tests, and the results are shown in Table 7.

TABLE 7

Results of Matter Property Tests in composition of Embodiment according to the present invention

| Test items | Embodiment 8 Coated loading material blending amount (% by weight) 55 |
|---|---|
| Tensile strength (kg/cm$^2$) | 420 |
| Flexural strength (kg/cm$^2$) | 910 |
| Flexural modulus (kg/cm$^2$) | 61,000 |
| Izod impact strength (kg-cm/cm$^2$) (with notch) | 3.2 |

As apparent from comparison between the embodiments 1 through 3 and the comparison examples of references 1 through 3, and comparison between the embodiments 4 through 6 and the comparison examples of references 4 through 6 as shown in the above embodiments and comparison examples, the polyolefin of the present invention is provided with extremely higher property of matter as compared with the use of the non-treated inorganic loading material and non-denatured polyolefin.

Also, as apparent from comparison between the embodiments 1 through 3 and the comparison examples of references 7 through 9, the polyolefin series composition of the present invention can be provided with such higher matter property as compared with a case where the denatured polyolefin was manufactured in advance.

Also, as apparent from FIG. 1 and FIG. 2, it can be seen that the polyolefin series composition of the present invention has heat-resistance properties extremely better than cases where the nontreated inorganic loading material and the non-denatured polyolefin were used or where the denatured polyolefin was manufactured in advance.

However, FIG. 1 and FIG. 2 show the results of heat-resistance tests, respectively, at 124° C. and 142° C. The bending strength tests of ASTM D-790 were performed to adapt the evaluation by the flexural strength retention or the like.

As described hereinabove, the polyolefin series composition of the present invention has the matter property and heat-resistance, which are extremely superior as compared with a case where the denatured polyolefin was manufactured in advance. The reasons are that, as compared to the two-stage heating process, the thermal oxidation deterioration of the polyolefin can be sharply reduced in a case of a one stage heating process under the existence of a dispersion agent and an antioxidant as in the present invention. Meanwhile, the thermal oxidation deterioration of the polyolefin is already considerably produced at one stage of the heating process wherein the denatured polyolefin is produced.

Thus, according to the composition of the present invention, it is important to have the dispersion agent and the antioxidant exist uniformly around the polyolefin. The method will suffice to uniformly blend the polyolefin, the organic silane series compound and the organic peroxide as shown in the embodiments 1 through 6, and thereafter add the dispersion agent, the antioxidant and the organic silane series compound coating inorganic loading material to perform the uniform blending operation thereof. However, the method is more advantageous when comprised of coating the organic silane series compound, the organic peroxide, the dispersion agent and the antioxidant uniformly on the polyolefin as shown in the embodiment 7, and thereafter adding the organic silane compound coating inorganic loading material to perform the uniform blending operation thereof. This effect is apparent through the comparison in the results of the matter property tests between the embodiment 2 and the embodiment 7.

Although the present invention has been described and illustrated in detail, it is to be clearly understood that the same is by way of illustration, the spirit and scope of the present invention being limited only by the terms of the appended claims.

What is claimed is:

1. A polyolefin series composition prepared by the process comprising:
   (a) surface treating a polyolefin with a mixture of an organic peroxide and an organic silane series compound to produce a surface coated polyolefin, said organic silane series compound includes at least one functional group selected from the group consisting of a methoxy group, ethoxy group, chloro group, vinyl group, methacryloxy group, amino group, cyclic epoxy group, clidoxy group and mercapto group;
   (b) surface treating an inorganic loading material with at least one of said organic silane compounds to produce a surface coated inorganic loading material;
   (c) uniformly blending, with heating and bonding, said surface coated polyolefin and said surface coated inorganic loading material with a dispersion agent and an antioxidant, said inorganic loading material being blended in an amount of 15–80% by weight.

2. A polyolefin series composition as in claim 1, wherein said polyolefin is a member selected from the group consisting of ethylene polymers and propylene polymers.

3. A polyolefin composition as in claim 1, wherein said inorganic loading material is a member selected from the group consisting of calcium carbonate, barium sulfate, talc, mica, calcium silicate and glass fibers.

4. A polyolefin composition as in claim 3, wherein said inorganic loading material is calcium silicate.

5. A polyolefin composition as in claim 1, wherein said organic silane series compound is gamma-methacryloxy propyl trimethoxy silane.

6. A polyolefin composition as in claim 1, wherein said organic silane series compound is a member selected from the group consisting of:

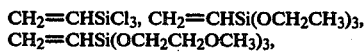
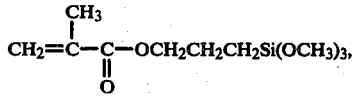
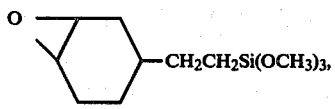
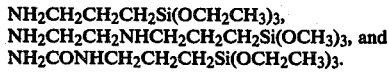

7. A molded product prepared from the composition according to claim 1.

8. A polyolefin series composition prepared by the process comprising:
  (a) surface treating a polyolefin with an organic silane series compound to produce a surface coated polyolefin, said organic silane series compound includes at least one functional group selected from the group consisting of a methoxy group, ethoxy group, chloro group, vinyl group, methacryloxy group, amino group, cyclic epoxy group, clidoxy group and mercapto group;
  (b) surface treating an inorganic loading material with a mixture of an organic peroxide and at least one of said organic silane compounds to produce a surface coated inorganic loading material; and
  (c) uniformly blending, with heating and bonding, said surface coated polyolefin and said surface coated inorganic loading material with a dispersion agent and an antioxidant, said inorganic loading material being blended in an amount of 15–80% by weight.

9. A polyolefin series composition as in claim 8, wherein said polyolefin is a member selected from the group consisting of ethylene polymers, propylene polymers, ethylene-propylene polymers, and ethylene-propylene block copolymers.

10. A polyolefin composition as in claim 8, wherein said inorganic loading material is a member selected from the group consisting of calcium carbonate, barium sulfate, talc, mica, calcium silicate and glass fibers.

11. A polyolefin composition as in claim 10, wherein said inorganic loading material is calcium silicate.

12. A polyolefin composition as in claim 8, wherein said organic silane series compound is gamma-methacryloxy propyl trimethoxy silane.

13. A polyolefin composition as in claim 8, wherein said organic silane series compound is a member selected from the group consisting of:

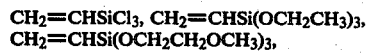
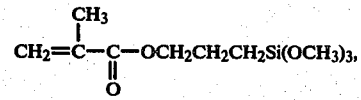
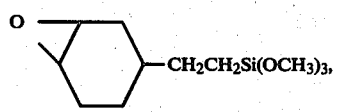
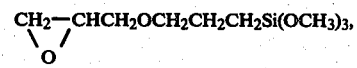
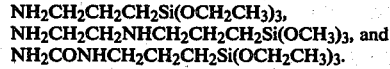

14. A molded product prepared from the composition according to claim 8.

15. A polyolefin series composition prepared by the process comprising:
  (a) surface treating a polyolefin with an organic peroxide to produce a surface coated polyolefin;
  (b) surface treating an organic loading material with an organic silane series compound to produce a surface coated inorganic loading material, said organic silane series compound includes at least one functional group selected from the group consisting of a methoxy group, ethoxy group, chloro group, vinyl group, methacryloxy group, amino group, cyclic epoxy group, clidoxy group and mercapto group; and
  (c) uniformly blending, with heating and bonding, said surface coated polyolefin and said surface coated inorganic loading material with a dispersion agent and an antioxidant, said inorganic loading material being blended in an amount of 15–80% by weight.

16. A polyolefin series composition as in claim 15, wherein said polyolefin is a member selected from the group consisting of ethylene polymers and propylene polymers.

17. A polyolefin composition as in claim 15, wherein said inorganic loading material is a member selected from the group consisting of calcium carbonate, barium sulfate, talc, mica, calcium silicate and glass fibers.

18. A polyolefin composition as in claim 17, wherein said inorganic loading material is calcium silicate.

19. A polyolefin composition as in claim 15, wherein said organic silane series compound is gamma-methacryloxy propyl trimethoxy silane.

20. A polyolefin composition as in claim 15, wherein said organic silane series compound is a member selected from the group consisting of:

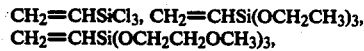

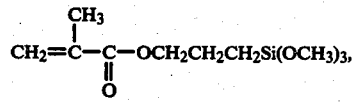

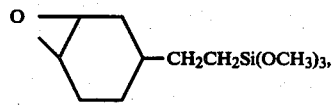

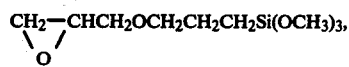

$NH_2CH_2CH_2CH_2Si(OCH_2CH_3)_3$,
$NH_2CH_2CH_2NHCH_2CH_2CH_2Si(OCH_3)_3$, and
$NH_2CONHCH_2CH_2CH_2Si(OCH_2CH_3)_3$.

21. A molded product prepared from the composition according to claim 15.

22. A polyolefin series composition as in claim 1, wherein said polyolefin is an ethylene-propylene polymer or an ethylene-propylene block copolymer.

23. A polyolefin series composition as in claim 15, wherein said polyolefin is an ethylene-propylene polymer or an ethylene-propylene block copolymer.

24. A method for preparing polyolefin series compositions comprising:
   (a) surface treating a polyolefin with at least one member selected from the group consisting of an organic peroxide and and organic silane series compound to produce a surface coated polyolefin, said organic silane series compound includes at least one functional group selected from the group consisting of a methoxy group, ethoxy group, chloro group, vinyl group, methacryloxy group, amino group, cyclic epoxy group, clidoxy group and mercapto group;
   (b) surface treating an inorganic loading material with at least one member selected from the group consisting of an organic peroxide and said organic silane compounds to produce a surface coated inorganic loading material; and
   (c) uniformly blending, with heating and bonding, said surface coated polyolefin and said surface coated inorganic loading material with a dispersion agent and an antioxidant, said inorganic loading material being blended in an amount of 15-80% by weight.

25. A method as in claim 24, wherein said polyolefin is surface coated with a mixture of an organic peroxide and at least one of said organic silane series compound and said inorganic loading material is surface coated with at least one of said organic silane series compound.

26. A method as in claim 24, wherein said polyolefin is surface coated with at least one of said silane series compound and said inorganic loading material is surface coated with a mixture of an organic peroxide and at least one of said organic silane series compound.

27. A method as in claim 24, wherein said polyolefin is surface coated with an organic peroxide and said inorganic loading material is surface coated with at least one of said organic silane series compound.

28. A method as in claim 24, wherein said organic peroxide is used in an amount of from 0.01 to 1.0% by weight based on the amount of said polyolefin.

29. A method as in claim 24, wherein said dispersion agent is a member selected from the group consisting of higher fatty acids, metallic soaps, and fatty acid amides.

30. A method as in claim 24, wherein said dispersion agent is used in an amount of from 0.05 to 3.0% by weight.

31. A method as in claim 24, wherein said antioxidant is at least one member selected from the group consisting of phenol series antioxidants, thioester series antioxidants, and phosphorous series antioxidants.

32. A method as in claim 24, wherein said antioxidant is used in an amount of from 0.1 to 3.0% by weight.

* * * * *